United States Patent Office 3,465,046
Patented Sept. 2, 1969

3,465,046
METHOD OF MAKING THE BROMOHYDRIN OF 2,3,4,5,6-PENTAMETHYLSTYRENE
Alfred E. Borchert, Cherry Hill, N.J., and Eugene C. Capaldi, Broomall, Pa., assignors to Atlantic Richfield Company, Philadelphia, Pa., a corporation of Pennsylvania
No Drawing. Original application July 20, 1965, Ser. No. 473,479. Divided and this application Apr. 2, 1968, Ser. No. 718,243
Int. Cl. C07d 102; C08g 23/00
U.S. Cl. 260—618
2 Claims

ABSTRACT OF THE DISCLOSURE

Method for the production of 2,3,4,5,6-pentamethylstyrene oxide by dissolving 2,3,4,5,6-pentamethylstyrene in a mixture of dimethylsulfoxide, tetrahydrofuran and water, adding N-bromosuccinimide to the solution, recovering the resulting bromohydrin from the reaction solution, reacting the bromohydrin with potassium hydroxide to produce the oxide and recovering the 2,3,4,5,6-pentamethylstyrene oxide from the solution.

CROSS-REFERENCE

This application is a division of our pending application Ser. No. 473,479, filed July 20, 1965, entitled "Pentamethylstyrene Oxide, Homopolymer and Copolymers Thereof," now abandoned.

This invention relates to 2,3,4,5,6-pentamethylstyrene oxide and to the homopolymer and copolymers thereof and, more particularly, it relates to the novel monomer and to the high molecular weight homopolymer thereof characterized by having an exceptionally high melting point.

The various ring substituted monomethyl, dimethyl and trimethyl styrene oxides have not been fully reported, although styrene oxide and its corresponding homopolymer is known. The polymer obtained from styrene oxide is similar to polystyrene in appearance and general behaviour. Contrary to the unsubstituted styrene oxide, the novel compound, 2,3,4,5,6-pentamethylstyrene oxide, which now has been prepared, has been found to have unique and unexpected properties, and it has been found that it is possible to prepare the homopolymer thereof and that it also has unique and unexpected properties, for example, an extremely high melting point, i.e. about 280° C. or higher.

It is an object of this invention to provide the novel compound 2,3,4,5,6-pentamethylstyrene oxide.

It is another object of this invention to provide a high molecular weight homopolymer of 2,3,4,5,6-pentamethylstyrene oxide.

It is another object of this invention to provide a novel polymer having recurring units of the structure

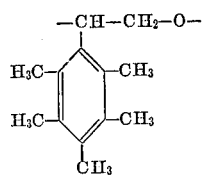

said polymer having a high melting point and a high enough molecular weight to form films, coatings and the like.

Other objects of the invention will be apparent from the following description and the claims.

The 2,3,4,5,6-pentamethylstyrene oxide may be synthesized from pentamethylstyrene in accordance with one method of preparation of this compound. The pentamethylstyrene is reacted with N-bromosuccinimide to produce the bromohydrin which in turn is reacted with alcoholic caustic to produce the desired 2,3,4,5,6-pentamethylstyrene oxide.

Homopolymers are prepared from the 2,3,4,5,6-pentamethylstyrene which have a melting point above 280° C. and have an inherent viscosity, measured at a 0.2 percent concentration in chloroform at 30° C., greater than 1.0.

The preparation of 2,3,4,5,6-pentamethylstyrene is described in the copending application to Capaldi et al., Ser. No. 386,788, filed July 31, 1964, entitled "Pentamethylstyrene, Homopolymer Thereof, and Its Preparation" and now Patent No. 3,303,176.

The following examples are provided for the purpose of illustrating a specific method of preparation of the 2,3,4,5,6-pentamethylstyrene oxide and the method for the preparation of the homopolymer and copolymers thereof.

Example I

To a stirred solution of 20 g. (0.115 mole) of pentamethylstyrene in a mixture of 200 ml. of tetrahydrofuran, 600 ml. of dimethylsulfoxide and 40 ml. of water was added 21.5 g. (0.121 mole) of N-bromosuccinimide. The mixture was stirred for 1 hour. Water was added and a solid precipitate was taken up in ether. The ether solution was washed with water and dried over anhydrous magnesium sulfate. Removal of solvent yielded 30.8 g. of crude bromohydrin which was refluxed in methanolic potassium hydroxide (50 g. of KOH in 600 ml. of CH₃OH) for 1 hour. The mixture was filtered, the filtrate evaporated, and a solid residue was taken up in ether. After washing with water and drying over anhydrous magnesium sulfate the ether was stripped yielding a solid residue which was chromatographed on neutral alumina to yield 14.8 g. (68 percent) of a colorless, crystalline product having a melting point of 73.5–74.5° C. The structure of the product was identified as 2,3,4,5,6-pentamethylstyrene oxide by infrared spectra and nuclear magnetic resonance spectra analyses and confirmed by carbon-hydrogen analysis wherein for the calculated composition, $C_{13}H_{18}O$: C=82.02 weight percent; H=9.53 weight percent and there was found C=81.80 weight percent, H=9.52 weight percent. Thus the elemental analysis fully confirmed the spectral analysis. The 2,3,4,5,6-pentamethylstyrene oxide thus prepared has the structure:

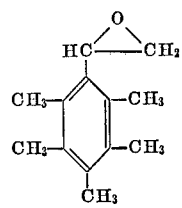

Example II

Pentamethylstyrene oxide prepared as in Example I in the amount of 0.021 mole was reacted in n-heptane as a diluent with 0.002 mole of a catalyst prepared by the addition of 0.02 mole of water to 0.04 mole of triisobutyl aluminum in 0.3 mole of n-heptane followed by the addition of 0.02 mole of acetyl acetone. The molar ratio of the reactants was Al(ibu)$_3$/0.5 H$_2$O/0.5 C$_5$H$_8$O$_2$. The monomer to aluminum molar ratio was 20:1 and the diluent to monomer weight ratio was 8:1. Polymerization was effected at 80° C. for 24 hours yielding a 15 percent conversion to methanol-insoluble polymer of inherent viscosity of 1.5 as measured at 0.2 percent concentration in chloroform at 30° C. The colorless, solid product melted in the range of 284–286° C. This polymer could be cast from a methylene chloride solution to form a hard self-supporting transparent film.

Example III

A mixture of the pentamethylstyrene oxide prepared as in Example I in an amount of 0.0105 mole and propylene oxide in the amount of 0.0105 mole was reacted in n-heptane at 80° C. for 24 hours with 0.002 mole of the catalyst prepared in the same manner as described in Example II. There was obtained a 32 percent conversion to a methanol-insoluble, high melting, colorless solid having an inherent viscosity of 2.1 measured at 0.2 percent concentration in chloroform at 30° C. This copolymer was also soluble in methylene chloride and could be cast into a hard self-supporting transparent film from the methylene chloride solution.

Example IV

A mixture of 0.0105 mole of pentamethylstyrene oxide and 0.0105 mole of 1,5-cyclooctadiene monoxide was reacted in n-heptane at 80° C. for 24 hours with 0.002 mole of the catalyst prepared as in Example II. A conversion or 11 percent to methanol-insoluble, high melting, colorless solid was obtained. The product contained olefinic unsaturation as found by nuclear magnetic resonance analysis and infrared analysis and was amenable to post polymerization crosslinking to produce high molecular weight resinous materials.

In general it has been found that the 2,3,4,5,6-pentamethylstyrene oxide will copolymerize with any organic epoxide having the general formula

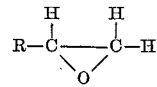

wherein R is any hydrocarbon radical containing up to 20 carbon atoms for example, alkyl, aryl, aralkyl, alkaryl, and the like, and also may be hydrogen.

The homopoymers and copolymers of 2,3,4,5,6-pentamethylstyrene oxide may be plasticized with conventional plasticizers such as chlorinated diphenyl and low molecular weight polyisobutylene to give a flexible coating composition, for example.

We claim:
1. The method for the production of the bromohydrin of 2,3,4,5,6-pentamethylstyrene consisting essentially of reacting 2,3,4,5,6-pentamethylstyrene with N-bromosuccinimide in a solvent consisting of dimethylsulfoxide, tetrahydrofuran and water.
2. The method according to claim 1 wherein the ratio of dimethylsulfoxide to tetrahydrofuran to water in the solvent mixture is about 15:5:1 by volume.

References Cited

UNITED STATES PATENTS 2,951,876  9/1960  Levi _____ 260—618

OTHER REFERENCES

Guss et al.: Jour. Am. Chem. Soc., vol. 77, May 5, 1956, p. 2549.

NORMA S. MILESTONE, Primary Examiner

U.S. Cl. X.R.
260—2, 348, 348.6